United States Patent
Botha (10) Patent No.: US 11,542,210 B2
(45) Date of Patent: Jan. 3, 2023

(54) METHOD OF PRODUCING A MONOAMMONIUM PHOSPHATE CONTAINING FERTILIZER SOLUTION

(71) Applicant: Liquigro Holdings (Proprietary) Limited, Hartbeesfontein (ZA)

(72) Inventor: Gerhardus Tredoux Botha, Hermanus (ZA)

(73) Assignee: Liquigro Holdings (Proprietary) Limited, Hartbeesfontein (ZA)

(*) Notice: Subject to any disclaimer, the term of this patent is extended or adjusted under 35 U.S.C. 154(b) by 179 days.

(21) Appl. No.: 16/082,429

(22) PCT Filed: Jun. 20, 2016

(86) PCT No.: PCT/IB2016/053649
§ 371 (c)(1),
(2) Date: Sep. 5, 2018

(87) PCT Pub. No.: WO2017/158406
PCT Pub. Date: Sep. 21, 2017

(65) Prior Publication Data
US 2019/0322596 A1 Oct. 24, 2019

(30) Foreign Application Priority Data
Mar. 15, 2016 (ZA) .................. 2016/01801

(51) Int. Cl.
C05B 7/00 (2006.01)
A01C 21/00 (2006.01)
C05G 5/23 (2020.01)

(52) U.S. Cl.
CPC .............. *C05B 7/00* (2013.01); *A01C 21/00* (2013.01); *C05G 5/23* (2020.02)

(58) Field of Classification Search
CPC ........... C05B 7/00; C05B 11/10; C05B 25/28; C05G 5/23; C05G 3/00; C05G 5/12; A01C 21/00; C01B 25/28
See application file for complete search history.

(56) References Cited

U.S. PATENT DOCUMENTS 2,799,569 A * 7/1957 Wordie ............... C05B 7/00
71/42
2,917,380 A * 12/1959 Franklin ............. C05G 5/23
71/34

(Continued)

FOREIGN PATENT DOCUMENTS

CN 101993052 A 3/2011
CN 102431984 A 5/2012

(Continued)

OTHER PUBLICATIONS

PubChem "Ammonium Hydroxide", accessed from https://pubchem.ncbi.nlm.nih.gov/compound/Ammonium-hydroxide#section=Depositor-Supplied-Synonyms&fullscreen=true (Year: 2020).*

(Continued)

Primary Examiner — Jennifer A Smith
(74) Attorney, Agent, or Firm — Clark & Elbing LLP (57) ABSTRACT

The present invention provides for a method for producing an aqueous monoammonium phosphate containing fertilizer solution. The method provides for means to control the temperature of a reaction zone as measured at a reagent entry point and a product exit point. The pH of the reaction is monitored and the reaction is terminated when the reaction mixture has reached a pH of between about 5.5 and about 7.5. The invention further provides for a method of treating crops with a monoammonium phosphate solution having a pH of between 6 and 7.

15 Claims, 6 Drawing Sheets

(56) References Cited

U.S. PATENT DOCUMENTS

| | | | |
|---|---|---|---|
| 2,969,280 A | | 1/1961 | Peck |
| 3,011,875 A | | 12/1961 | Sumner |
| 3,179,496 A | * | 4/1965 | Skinner ..................... C05B 7/00 |
| | | | 71/42 |
| 3,375,063 A | | 3/1968 | Bookey et al. |
| 3,459,499 A | | 8/1969 | Mullen |
| 3,484,192 A | | 12/1969 | Farr et al. |
| 4,066,432 A | * | 1/1978 | Jones ........................ C05B 7/00 |
| | | | 71/34 |
| 4,610,853 A | | 9/1986 | Kajitani et al. |
| 8,568,506 B1 | * | 10/2013 | Miller ............................... 71/28 |

FOREIGN PATENT DOCUMENTS

| | | | | |
|---|---|---|---|---|
| EP | 0161704 A2 | | 11/1985 | |
| EP | 1992217 A1 | | 11/2008 | |
| EP | 1992217 B1 | * | 11/2008 | ............... A01G 9/10 |

OTHER PUBLICATIONS

International Search Report and Written Opinion for International Patent Application No. PCT/IB2016/053649, dated Dec. 7, 2016 (11 pages).

* cited by examiner

| Norm | | 4-5% | 0.3-0.8% | 0.2-0.6% | 3-4% | | 0.18-0.5% | 0.4-0.6% | 40-250 | 25-180 | 6-20ppm | 20-60 | 0.1-2 | 5-20ppm |
|---|---|---|---|---|---|---|---|---|---|---|---|---|---|---|
| Sample ID | Camp | Lab ID | Crop | N (%) | Ca (%) | Mg (%) | K (%) | Na (%) | S (%) | P (%) | Fe (mg/kg) | Mn (mg/kg) | Cu (mg/kg) | Zn (mg/kg) | Mo (mg/kg) | B (mg/kg) |
| CONTROL | 0 | CT16-00867.005 | MAIZE | 4.20 | 0.40 | 0.35 | 2.08 | 0.002 | 0.22 | 0.27 | 166 | 81 | 8 | 34 | 0.01 | 8 |
| 100L AmOP per ha | 1A | CT16-00867.001 | MAIZE | 4.48 | 0.56 | 0.44 | 2.46 | 0.003 | 0.23 | 0.86 | 262 | 94 | 11 | 41 | 0.18 | 9 |
| 200L AmOP per ha | 1B | CT16-00867.016 | MAIZE | 4.54 | 0.55 | 0.48 | 2.31 | 0.007 | 0.23 | 1.04 | 288 | 97 | 10 | 36 | 0.74 | 8 |
| 100L AmOP per ha | 2A | CT16-00867.002 | MAIZE | 4.54 | 0.54 | 0.45 | 2.03 | 0.005 | 0.18 | 1.17 | 285 | 91 | 10 | 30 | 0.02 | 11 |
| 200L AmOP per ha | 2B | CT16-00867.017 | MAIZE | 4.69 | 0.44 | 0.45 | 2.38 | 0.009 | 0.21 | 1.33 | 286 | 88 | 13 | 41 | 0.52 | 8 |
| 100L AmOP per ha | 3A | CT16-00867.003 | MAIZE | 4.66 | 0.57 | 0.41 | 2.33 | 0.005 | 0.22 | 0.92 | 328 | 98 | 9 | 30 | 0.38 | 9 |
| 200L AmOP per ha | 3B | CT16-00867.018 | MAIZE | 4.72 | 0.50 | 0.48 | 2.59 | 0.006 | 0.17 | 1.86 | 393 | 113 | 13 | 34 | 1.19 | 8 |
| 100L AmOP per ha | 4A | CT16-00867.004 | MAIZE | 4.63 | 0.49 | 0.38 | 2.41 | 0.003 | 0.20 | 1.26 | 407 | 113 | 10 | 29 | 1.08 | 7 |
| 200L AmOP per ha | 4B | CT16-00867.019 | MAIZE | 4.92 | 0.52 | 0.47 | 2.17 | 0.007 | 0.16 | 1.68 | 374 | 107 | 5 | 29 | 1.86 | 8 |
| CONTROL | 5 | CT16-00867.020 | MAIZE | 4.46 | 0.49 | 0.39 | 2.65 | 0.005 | 0.23 | 0.32 | 261 | 92 | 9 | 22 | 0.09 | 7 |
| 100L AmOP per ha | 6A | CT16-00867.006 | MAIZE | 4.58 | 0.44 | 0.35 | 2.42 | 0.004 | 0.19 | 1.32 | 344 | 103 | 11 | 28 | 0.85 | 7 |
| 200L AmOP per ha | 6B | CT16-00867.021 | MAIZE | 4.25 | 0.55 | 0.49 | 2.34 | 0.011 | 0.14 | 1.65 | 337 | 98 | 5 | 26 | 0.57 | 7 |
| 100L AmOP per ha | 7A | CT16-00867.007 | MAIZE | 4.41 | 0.43 | 0.38 | 2.32 | 0.002 | 0.21 | 1.07 | 368 | 92 | 9 | 24 | 0.76 | 6 |
| 200L AmOP per ha | 7B | CT16-00867.022 | MAIZE | 4.76 | 0.59 | 0.51 | 1.85 | 0.010 | 0.18 | 1.44 | 333 | 128 | 6 | 32 | 0.01 | 9 |
| 100L AmOP per ha | 8A | CT16-00867.008 | MAIZE | 4.15 | 0.52 | 0.34 | 2.73 | 0.004 | 0.26 | 0.68 | 304 | 175 | 9 | 34 | 2.56 | 14 |
| 200L AmOP per ha | 8B | CT16-00867.023 | MAIZE | 4.78 | 0.49 | 0.40 | 2.13 | 0.010 | 0.17 | 1.42 | 394 | 124 | 11 | 30 | 5.45 | 6 |
| 100L AmOP per ha | 9A | CT16-00867.009 | MAIZE | 4.38 | 0.61 | 0.42 | 2.14 | 0.004 | 0.22 | 0.96 | 379 | 145 | 8 | 33 | 0.44 | 8 |
| 200L AmOP per ha | 9B | CT16-00867.024 | MAIZE | 4.56 | 0.43 | 0.41 | 2.16 | 0.004 | 0.14 | 1.55 | 325 | 97 | 14 | 28 | 2.82 | 6 |
| 100L AmOP per ha | 10A | CT16-00867.010 | MAIZE | 4.20 | 0.57 | 0.43 | 2.41 | 0.004 | 0.23 | 0.68 | 269 | 139 | 11 | 40 | 0.24 | 9 |
| 200L AmOP per ha | 10B | CT16-00867.025 | MAIZE | 4.92 | 0.66 | 0.51 | 1.85 | 0.011 | 0.19 | 1.15 | 302 | 144 | 10 | 34 | 1.25 | 7 |
| 100L AmOP per ha | 11A | CT16-00867.011 | MAIZE | 5.24 | 0.53 | 0.38 | 2.59 | 0.003 | 0.33 | 0.70 | 328 | 164 | 10 | 51 | 0.50 | 8 |
| 200L AmOP per ha | 11B | CT16-00867.026 | MAIZE | 5.48 | 0.59 | 0.46 | 2.03 | 0.014 | 0.31 | 1.00 | 393 | 145 | 16 | 71 | 0.37 | 7 |
| 100L AmOP per ha | 12A | CT16-00867.012 | MAIZE | 5.10 | 0.52 | 0.42 | 1.81 | 0.004 | 0.27 | 0.59 | 290 | 136 | 8 | 45 | 0.88 | 9 |
| 200L AmOP per ha | 12B | CT16-00867.027 | MAIZE | 5.28 | 0.58 | 0.47 | 1.79 | 0.012 | 0.29 | 0.92 | 422 | 125 | 11 | 60 | 0.67 | 5 |
| 100L AmOP per ha | 13A | CT16-00867.013 | MAIZE | 4.00 | 0.59 | 0.46 | 1.88 | 0.004 | 0.23 | 0.41 | 304 | 148 | 7 | 40 | 0.83 | 13 |
| 200L AmOP per ha | 13B | CT16-00867.028 | MAIZE | 5.07 | 0.64 | 0.47 | 2.04 | 0.008 | 0.31 | 0.58 | 341 | 195 | 11 | 41 | 0.15 | 7 |
| 100L AmOP per ha | 14A | CT16-00867.014 | MAIZE | 4.44 | 0.72 | 0.51 | 2.15 | 0.003 | 0.24 | 0.45 | 378 | 200 | 8 | 46 | 1.19 | 8 |
| 200L AmOP per ha | 14B | CT16-00867.029 | MAIZE | 4.85 | 0.67 | 0.60 | 1.48 | 0.010 | 0.16 | 2.03 | 433 | 165 | 15 | 34 | 1.65 | 7 |
| 100L AmOP per ha | 15A | CT16-00867.015 | MAIZE | 4.76 | 0.60 | 0.43 | 2.05 | 0.004 | 0.21 | 0.92 | 332 | 148 | 11 | 33 | 0.23 | 7 |
| 200L AmOP per ha | 15B | CT16-00867.030 | MAIZE | 4.73 | 0.58 | 0.51 | 1.62 | 0.010 | 0.17 | 1.73 | 388 | 139 | 15 | 33 | 0.25 | 7 |

FIG. 4

| Sample ID | Camp | L/ha | Lab ID | Crop | N (%) | Ca (%) | Mg (%) | K (%) | Na (%) | S% | P (%) | Fe(mg/kg) | Mn (mg/kg) | Cu (mg/kg) | Zn (mg/kg) | Mo (mg/kg) | B (mg/kg) |
|---|---|---|---|---|---|---|---|---|---|---|---|---|---|---|---|---|---|
| V514362 | HLL Kont | 0 | CT16-01483.001 | POTATOES | 5.73 | 2.05 | 1.13 | 4.12 | 0.019 | 0.40 | 0.43 | 346 | 412 | 7 | 22 | 0.05 | 35 |
| V514363 | HLL 1 | 50 L AmOP | CT16-01483.002 | POTATOES | 5.49 | 2.12 | 1.06 | 4.21 | 0.023 | 0.31 | 0.68 | 339 | 598 | 7 | 37 | 6.68 | 72 |
| V514364 | HLL 2+3 | 100 L AmOP | CT16-01483.003 | POTATOES | 6.27 | 2.18 | 1.15 | 3.65 | 0.026 | 0.51 | 1.62 | 412 | 465 | 13 | 31 | 1.98 | 52 |
| V514365 | HLL 4 | 150 L AmOP | CT16-01483.004 | POTATOES | 6.49 | 1.98 | 1.13 | 3.85 | 0.024 | 0.50 | 1.93 | 297 | 482 | 8 | 28 | 2.57 | 48 |
| V514366 | HLR Kont | 0 | CT16-01483.005 | POTATOES | 5.86 | 2.38 | 1.30 | 3.74 | 0.025 | 0.37 | 0.41 | 489 | 190 | 11 | 30 | 0.04 | 41 |
| V514367 | HLR 1 | 50 L AmOP | CT16-01483.006 | POTATOES | 6.22 | 2.13 | 1.15 | 3.42 | 0.027 | 0.50 | 0.93 | 335 | 319 | 9 | 38 | 1.93 | 68 |
| V514368 | HLR 2+3 | 100 L AmOP | CT16-01483.007 | POTATOES | 6.37 | 2.32 | 1.28 | 3.34 | 0.028 | 0.47 | 1.44 | 430 | 345 | 9 | 34 | 1.60 | 49 |
| V514369 | HLR 4 | 150 L AmOP | CT16-01483.008 | POTATOES | 6.22 | 2.43 | 1.25 | 3.59 | 0.031 | 0.45 | 1.76 | 541 | 272 | 10 | 35 | 0.96 | 49 |
| V514370 | JvdM kont | 0 | CT16-01483.009 | POTATOES | 5.35 | 2.04 | 0.81 | 5.25 | 0.034 | 0.30 | 0.31 | 298 | 277 | 7 | 22 | 0.18 | 41 |
| V514371 | JvdM 1 | 25 | CT16-01483.010 | POTATOES | 5.64 | 2.22 | 0.87 | 4.67 | 0.031 | 0.36 | 0.76 | 482 | 290 | 9 | 18 | 0.02 | 42 |
| V514372 | JvdM 2 | 50 | CT16-01483.011 | POTATOES | 6.21 | 1.83 | 0.76 | 5.34 | 0.029 | 0.33 | 1.08 | 485 | 189 | 7 | 18 | 0.04 | 36 |
| V514373 | JvdM 3 | 100 | CT16-01483.012 | POTATOES | 6.50 | 1.85 | 0.77 | 5.52 | 0.028 | 0.37 | 1.55 | 500 | 174 | 8 | 18 | 0.02 | 37 |
| V514374 | JvdM 4 | 150 | CT16-01483.013 | POTATOES | 6.14 | 1.77 | 0.78 | 5.34 | 0.040 | 0.40 | 1.71 | 611 | 187 | 9 | 23 | 0.02 | 36 |

FIG. 5

| Sample ID | Camp | Lab ID | Crop | N (%) | Ca (%) | Mg (%) | K (%) | Na (%) | S (%) | P (%) | Fe (mg/kg) | Mn (mg/kg) | Cu (mg/kg) | Zn (mg/kg) | Mo (mg/kg) | B (mg/kg) |
|---|---|---|---|---|---|---|---|---|---|---|---|---|---|---|---|---|
| V514278 | CONTROL | CT16-01264.001 | Peanuts | 4.19 | 0.40 | 0.25 | 3.03 | 0.017 | 0.23 | 0.30 | 332 | 65 | 10 | 22 | 0.08 | 11 |
| V514279 | 200L AmOP | CT16-01264.002 | Peanuts | 5.16 | 0.46 | 0.34 | 2.87 | 0.022 | 0.27 | 0.62 | 592 | 74 | 10 | 33 | 1.41 | 13 |
| V514280 | CONTROL | CT16-01264.003 | Peanuts | 3.56 | 1.38 | 0.47 | 2.40 | 0.020 | 0.24 | 0.22 | 315 | 170 | 8 | 31 | 0.69 | 28 |
| V514281 | 200L AmOP | CT16-01264.004 | Peanuts | 4.03 | 1.26 | 0.45 | 2.57 | 0.034 | 0.25 | 0.64 | 414 | 176 | 8 | 29 | 0.01 | 27 |
| V514282 | 100L AmOP | CT16-01264.005 | Peanuts | 3.57 | 1.21 | 0.46 | 2.22 | 0.018 | 0.22 | 0.39 | 317 | 122 | 7 | 24 | 0.02 | 25 |
| V514283 | 80L AmOP | CT16-01264.006 | Peanuts | 3.77 | 1.24 | 0.42 | 2.56 | 0.021 | 0.26 | 0.41 | 358 | 168 | 8 | 28 | 0.32 | 30 |
| V514284 | 3Kg MAP tegnies | CT16-01264.007 | Peanuts | 3.40 | 1.28 | 0.47 | 2.60 | 0.019 | 0.22 | 0.25 | 227 | 144 | 7 | 27 | 0.02 | 26 |
| V514285 | 3kg Nutrigro | CT16-01264.008 | Peanuts | 3.48 | 1.20 | 0.37 | 2.00 | 0.025 | 0.20 | 0.20 | 260 | 139 | 8 | 29 | 0.01 | 27 |
| V514286 | 3L Nutrispray P+K | CT16-01264.009 | Peanuts | 3.67 | 1.22 | 0.41 | 2.45 | 0.022 | 0.21 | 0.22 | 232 | 135 | 7 | 29 | 2.25 | 27 |
| V514287 | 4L Popup | CT16-01264.010 | Peanuts | 3.73 | 1.38 | 0.47 | 2.80 | 0.022 | 0.23 | 0.23 | 289 | 135 | 8 | 31 | 1.22 | 30 |
| V514288 | CONTROL | CT16-01264.011 | Peanuts | 3.61 | 1.19 | 0.40 | 2.32 | 0.020 | 0.22 | 0.21 | 363 | 128 | 9 | 29 | 1.24 | 27 |
| V514289 | 80L AmOP cp ry | CT16-01257.001 | Peanuts | 2.91 | 1.27 | 0.46 | 1.99 | 0.038 | 0.17 | 0.50 | 497 | 137 | 8 | 33 | 0.48 | 27 |

FIG. 6

| Norm | | | | 4-5% | 0.3-0.8% | 0.2-0.5% | 3-4% | | 0.18-0.5% | 0.4-0.8% | 40-250 | 25-180 | 5-20ppm | 20-60 | 0.1-2 | 5-20ppm |
|---|---|---|---|---|---|---|---|---|---|---|---|---|---|---|---|---|
| Sample ID | Camp | Lab ID | Crop | N (%) | Ca (%) | Mg (%) | K (%) | Na (%) | S (%) | P (%) | Fe (mg/kg) | Mn (mg/kg) | Cu (mg/kg) | Zn (mg/kg) | Mo (mg/kg) | B (mg/kg) |
| CONTROL | 0 | CT 16-00867.005 | MAIZE | 4.20 | 0.40 | 0.35 | 2.08 | 0.002 | 0.22 | 0.27 | 166 | 81 | 8 | 34 | 0.01 | 8 |
| 100L AmOP+5kg Ureum | 1A | CT 16-00867.001 | MAIZE | 4.48 | 0.56 | 0.44 | 2.46 | 0.003 | 0.23 | 0.86 | 262 | 94 | 11 | 41 | 0.18 | 9 |
| 200 L AmOP+10Kg Ureum | 1B | CT 16-00867.016 | MAIZE | 4.54 | 0.55 | 0.48 | 2.31 | 0.007 | 0.23 | 1.04 | 288 | 97 | 10 | 36 | 0.74 | 8 |
| 100L AmOP+5kg ureum+10L CMS | 2A | CT 16-00867.002 | MAIZE | 4.54 | 0.54 | 0.45 | 2.03 | 0.005 | 0.18 | 1.17 | 285 | 91 | 10 | 30 | 0.02 | 11 |
| 200L AmOP+10kg ureum+20LCMS | 2B | CT 16-00867.017 | MAIZE | 4.69 | 0.44 | 0.45 | 2.38 | 0.009 | 0.21 | 1.33 | 286 | 88 | 13 | 41 | 0.52 | 8 |
| 100L AmOP+10Kg Ureum | 3A | CT 16-00867.003 | MAIZE | 4.66 | 0.57 | 0.41 | 2.33 | 0.005 | 0.22 | 0.92 | 328 | 98 | 9 | 30 | 0.38 | 9 |
| 200L AmOP+20Kg ureum | 3B | CT 16-00867.018 | MAIZE | 4.72 | 0.50 | 0.48 | 2.59 | 0.006 | 0.17 | 1.86 | 393 | 113 | 13 | 34 | 1.19 | 8 |
| 100LAmOP+10kgUreum+10KgCMS | 4A | CT 16-00867.004 | MAIZE | 4.63 | 0.49 | 0.38 | 2.41 | 0.003 | 0.20 | 1.26 | 407 | 113 | 10 | 29 | 1.08 | 7 |
| | 4B | CT 16-00867.019 | MAIZE | 4.92 | 0.52 | 0.47 | 2.17 | 0.007 | 0.16 | 1.68 | 374 | 107 | 5 | 29 | 1.86 | 8 |
| CONTROL | 5 | CT 16-00867.020 | MAIZE | 4.46 | 0.49 | 0.39 | 2.65 | 0.005 | 0.23 | 0.32 | 261 | 92 | 9 | 22 | 0.09 | 7 |
| 100L AmOP+10L Mikroboost | 6A | CT 16-00867.006 | MAIZE | 4.58 | 0.44 | 0.35 | 2.42 | 0.004 | 0.19 | 1.32 | 344 | 103 | 11 | 28 | 0.85 | 7 |
| | 6B | CT 16-00867.021 | MAIZE | 4.25 | 0.55 | 0.49 | 2.34 | 0.011 | 0.14 | 1.65 | 337 | 98 | 5 | 26 | 0.57 | 7 |
| 100L AmOP+10L Fulwiensuur | 7A | CT 16-00867.007 | MAIZE | 4.41 | 0.43 | 0.38 | 2.32 | 0.002 | 0.21 | 1.07 | 368 | 92 | 9 | 24 | 0.76 | 6 |
| | 7B | CT 16-00867.022 | MAIZE | 4.76 | 0.59 | 0.51 | 1.85 | 0.010 | 0.18 | 1.44 | 333 | 128 | 6 | 32 | 0.01 | 9 |
| 100L AmOP + 10L Terra Boor | 8A | CT 16-00867.008 | MAIZE | 4.15 | 0.52 | 0.34 | 2.73 | 0.004 | 0.26 | 0.68 | 304 | 175 | 9 | 34 | 2.56 | 14 |
| | 8B | CT 16-00867.023 | MAIZE | 4.78 | 0.49 | 0.40 | 2.13 | 0.010 | 0.17 | 1.42 | 394 | 124 | 11 | 30 | 5.45 | 6 |
| 100L AmOP+10L Aminostim | 9A | CT 16-00867.009 | MAIZE | 4.38 | 0.61 | 0.42 | 2.14 | 0.004 | 0.22 | 0.96 | 379 | 145 | 8 | 33 | 0.44 | 8 |
| | 9B | CT 16-00867.024 | MAIZE | 4.56 | 0.43 | 0.41 | 2.16 | 0.010 | 0.14 | 1.55 | 325 | 97 | 14 | 28 | 2.82 | 6 |
| 100LAmOP+5kgKCl+5kg Ureum+5L CMS | 10A | CT 16-00867.010 | MAIZE | 4.20 | 0.57 | 0.43 | 2.41 | 0.004 | 0.23 | 0.68 | 269 | 139 | 11 | 40 | 0.24 | 9 |
| | 10B | CT 16-00867.025 | MAIZE | 4.92 | 0.66 | 0.51 | 1.85 | 0.011 | 0.19 | 1.15 | 302 | 144 | 10 | 34 | 1.25 | 7 |
| 100L 3.5:1:0 50% oplos | 11A | CT 16-00867.011 | MAIZE | 5.24 | 0.53 | 0.38 | 2.59 | 0.003 | 0.33 | 0.70 | 328 | 164 | 10 | 51 | 0.50 | 8 |
| | 11B | CT 16-00867.026 | MAIZE | 5.48 | 0.59 | 0.46 | 2.03 | 0.014 | 0.31 | 1.00 | 393 | 145 | 16 | 71 | 0.37 | 7 |
| 100L 3.5:1:0 25% oplosing | 12A | CT 16-00867.012 | MAIZE | 5.10 | 0.52 | 0.42 | 1.81 | 0.004 | 0.27 | 0.59 | 290 | 136 | 8 | 45 | 0.88 | 9 |
| | 12B | CT 16-00867.027 | MAIZE | 5.28 | 0.58 | 0.47 | 1.79 | 0.012 | 0.29 | 0.92 | 422 | 125 | 11 | 60 | 0.67 | 5 |
| 100L 3.5:1:0 10% oplossing | 13A | CT 16-00867.013 | MAIZE | 4.00 | 0.59 | 0.46 | 1.88 | 0.004 | 0.23 | 0.41 | 304 | 148 | 7 | 40 | 0.83 | 13 |
| | 13B | CT 16-00867.028 | MAIZE | 5.07 | 0.64 | 0.47 | 2.04 | 0.008 | 0.31 | 0.58 | 341 | 195 | 11 | 41 | 0.15 | 7 |
| 100L 3.5:1:0 5% Oplossing | 14A | CT 16-00867.014 | MAIZE | 4.44 | 0.72 | 0.51 | 2.15 | 0.003 | 0.24 | 0.45 | 378 | 200 | 8 | 46 | 1.19 | 8 |
| | 14B | CT 16-00867.029 | MAIZE | 4.86 | 0.67 | 0.60 | 1.48 | 0.010 | 0.16 | 2.03 | 433 | 165 | 15 | 34 | 1.65 | 7 |
| 100L AmOP | 15A | CT 16-00867.015 | MAIZE | 4.76 | 0.60 | 0.43 | 2.05 | 0.004 | 0.21 | 0.92 | 332 | 148 | 11 | 33 | 0.23 | 7 |
| | 15B | CT 16-00867.030 | MAIZE | 4.73 | 0.58 | 0.51 | 1.62 | 0.010 | 0.17 | 1.73 | 388 | 139 | 15 | 33 | 0.25 | 7 |

METHOD OF PRODUCING A MONOAMMONIUM PHOSPHATE CONTAINING FERTILIZER SOLUTION

INTRODUCTION

This invention relates to a method of producing a monoammonium phosphate fertilizer solution, to a method of treating crops with a monoammonium phosphate fertilizer solution, and in particular but not exclusively, to a method of producing, and treating crops with, a monoammonium phosphate solution having a pH of between 6 and 7.

BACKGROUND

A fertilizer is a natural or synthetic material that is applied to soils or directly to crops to supply one or more plant nutrients which are essential for the growth of the plant. A popular and widely used two-component fertilizer is a fertilizer containing phosphorus and nitrogen (NP fertilizers). These NP fertilizers are generally available as monoammonium phosphate (MAP) and diammonium phosphate (DAP).

The application of a fertilizer providing the optimum amounts of phosphorus and nitrogen is critical to the growth rate and general health of most crop species. Although the total amount of phosphorus in the soil may be high, it is often present in unavailable forms. As a result, unfertilized soils do not generally release phosphorus fast enough to support the energy needs and high growth rates of many crop species.

In many agricultural systems in which the application of phosphorus to the soil is necessary to ensure plant productivity, the recovery of applied phosphorus by crops in a growing season is very low, because most of the phosphorus becomes immobile in soil, or otherwise unavailable for plant uptake.

Therefore, it goes without saying that the application, in a convenient and safe form, of high concentrations (or quantities) of phosphorus and nitrogen is extremely desirable. However, known NP fertilizers suffer from many disadvantages such as the application thereof leading to the acidification of soil, damage inflicted on irrigation equipment due to the corrosive nature thereof when dissolved in water, damage to microbial colonies in treated soils as a result of pH fluctuations, the migration of water as a result of a high salt index, and most importantly the limited amounts that can be safely applied without the crops sustaining fertilizer burn.

It is therefore an object of the present invention to address at least some of the shortcomings of the prior art.

SUMMARY OF THE INVENTION

According to a first aspect to the present invention there is provided a method for producing an aqueous monoammonium phosphate containing fertilizer solution, the method comprising the steps of:
a) providing phosphoric acid at a concentration of about 20% to about 30% v/v in a first vessel;
b) circulating the phosphoric acid through a product reaction zone having a reagent entry point and an product exit point,
c) contacting the phosphoric acid with a solution of ammonium hydroxide at the product reaction zone to form a reaction mixture,
d) providing means to control the temperature of the reaction zone as measured at the reagent entry point and the product exit point, wherein the temperature of the reaction zone is controlled such that the reagent entry point and product exit point is maintained at between about 20° C. and about 45° C.,
e) monitoring the pH of the reaction mixture, and
f) terminating the reaction when the reaction mixture has reached a pH of between about 5.5 and about 7.5.

In a preferred embodiment the method is a batch method.

In a particularly preferred embodiment the reaction is terminated at a pH of between about 6 and about 7.

Preferably the monoammonium phosphate solution has an orthophosphate to polyphosphate ratio of more than about 9:1.

More preferably the monoammonium phosphate solution has an orthophosphate to polyphosphate ratio of more than about 9.5:1.

Most preferably the monoammonium phosphate solution has an orthophosphate to polyphosphate ratio of about 9.95:0.5.

Preferably the phosphoric acid is provided at a concentration of about 24% to about 27%.

Even more preferably, the phosphoric acid is provided at a concentration of about 25%.

In one embodiment the phosphoric acid is circulated via a pump from the first vessel through the reaction zone and back to the first vessel.

Preferably, the ammonium hydroxide solution is introduced to the reaction zone through at least one reagent inlet port, where the ammonium hydroxide solution contacts with the phosphoric acid and is circulated to the first vessel.

In one embodiment the method comprises using two reagent inlet ports.

The phosphoric acid solution may be prepared by providing phosphoric acid in the first vessel in an undiluted form, adding water to the first vessel, then circulating the mixture via a pump from the first vessel through the reaction zone and back to the first vessel for a set time.

In a preferred embodiment the temperature of the reaction zone is at least partially controlled by adjusting the flow rate of the ammonium hydroxide solution.

In a preferred embodiment the flow rate of the ammonium hydroxide solution is between about 600 and about 850 liters per hour.

In a particularly preferred embodiment the flow rate of the ammonium hydroxide solution is between about 650 and about 800 liters per hour.

In an even more preferred embodiment the flow rate of the ammonium hydroxide solution is about 750 liters per hour.

According to a second aspect to the present invention there is provided a method of treating crops comprising the step of spraying an ammonium phosphate fertilizer solution onto the crops, wherein the solution has a pH value of between about 6 and about 7, wherein the monoammonium phosphate solution has an orthophosphate to polyphosphate ratio of more than about 9:1, and wherein the solution is applied to the crops at a concentration of greater than about 2.5 kg per ha phosphorus.

Preferably, the fertilizer solution is applied to the crops at a concentration of about 5 kg to about 10 kg per ha phosphorus.

Most preferably, the fertilizer solution is applied to the crops at a concentration of about 10 kg per ha phosphorus.

BRIEF DESCRIPTION OF THE DRAWINGS

The invention will now be described in more detail with reference to the following non-limiting embodiments and figures in which:

FIG. 3 shows a results table for various experiments conducted on maize;

FIG. 6 shows a results table for various experiments conducted on maize crops;

DETAILED DESCRIPTION OF A PREFERRED EMBODIMENT

The present invention will now be described more fully hereinafter with reference to the accompanying figures, in which some of the non-limiting embodiments of the invention are shown.

The invention as described hereinafter should not be construed to be limited to the specific embodiments disclosed, with slight modifications and other embodiments intended to be included within the scope of the invention.

Although specific terms are employed herein, they are used in a generic and descriptive sense only and not for purposes of limitation.

As used herein, throughout this specification and in the claims which follow, the singular forms "a", "an" and "the" include the plural form, unless the context clearly indicates otherwise.

The terminology and phraseology used herein is for the purpose of description and should not be regarded as limiting. The use of the terms "comprising", "containing", "having", "including", and variations thereof used herein, are meant to encompass the items listed thereafter, and equivalents thereof as well as additional items.

The present invention relates to a method of producing a monoammonium phosphate fertilizer solution and to a method of treating crops with a monoammonium phosphate fertilizer solution.

As used in this specification the term phosphoric acid should be understood to mean orthophosphoric acid having the chemical formula $H_3PO_4$.

Orthophosphoric acid has three hydrogen atoms bonded to oxygen atoms in its structure. All three hydrogen atoms are acidic to varying degrees, and can be lost from the molecule as $H^+$ ions. The orthophosphate anions $H_2PO_4^-$, $HPO_4^{2-}$, and $PO_4^{3-}$ are formed when one, two, or all of the hydrogen ions are lost from orthophosphoric acid.

The terms "monoammonium phosphate", "ammonium dihydrogen phosphate", and "monoammonium orthophosphate" are used interchangeably in this specification, and should be understood to mean the charge neutral compound $[H_2PO_4]^-NH_4^+$, having the chemical structure:

As used in this specification the term "polyphosphates" should be understood to mean salts or esters of polymeric oxyanions formed from $PO_4^{3-}$, the structural being linked together by sharing oxygen atoms. Polyphosphates arise by the polymerization of phosphoric acid derivatives.

Figure 1:
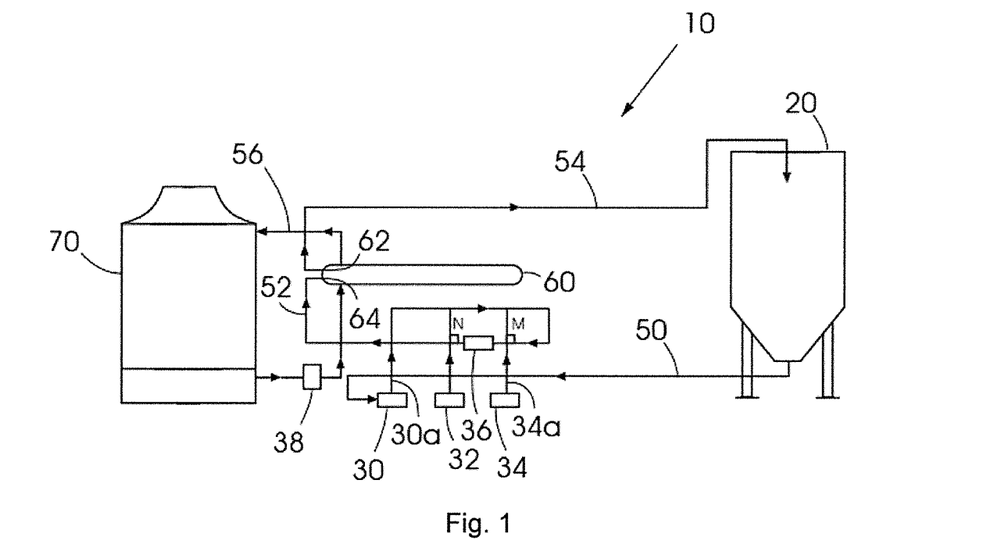
FIG. 1 shows a schematic illustration of the process setup used in the method according to the present invention.

FIG. 1 shows a schematic illustration of the process setup 10 that may be used in the method according to the present invention. Phosphoric acid (SG at 20° C. typical 1.67; minimum 1.64; maximum 1.72; % solids 0.5 typical; 0.1 minimum; 1.0 maximum; % $H_3PO_4$ 53.00 typical; 52.00 minimum; 55.00 maximum) at a concentration of about 54% v/v is pumped into a first vessel 20. Water is then added to the first vessel 20. The volume of water used is selected such that, after mixing, a final diluted phosphoric acid solution at a concentration of about 20% to about 30% v/v is attained.

Once the phosphoric acid and water has been added to the first vessel 20, the pump 30 is switched on. The first vessel 20 is in fluid communication with the pump 30 via a pipe section 50, and a pipe section 30a leads from the pump to the reaction zone 36. A pipe section 52 connects the reaction zone 36 to the heat exchanger 60, which in turn is connect with a return pipe 54 which leads back to the first vessel 20. During the initial stages of the method, prior to the introduction of any further reagents, the pump 30 circulates the phosphoric acid and water through the pipe 50 via the reaction zone 36 through the cooler unit 60 back to the first vessel 20 via the return pipe 54. The mixture is circulated for about 10 to about 15 minutes.

The heat exchanger 60 is provided with water via a water reservoir 70, a pump 38, and a pipe section 56 connecting the water reservoir, pump, and cooler unit. Water is continuously circulated through the heat exchanger 60 to control the temperature of the reaction zone 36. The circulation of water through the heat exchanger 60 may already commence during the mixing of the phosphoric acid and water, as described above. The water may be circulated through the cooling system until a stable temperature of about 37° C. is reached, as measured in the area of the reaction zone.

Once the system is at the predetermined temperature and the phosphoric acid and water has been sufficiently mixed, the ammonium hydroxide solution is introduced from any suitable container or reservoir (not shown) via a reagent inlet port 32, or reagent inlet ports 32 and 34.

At this point the ammonium hydroxide solution is brought into contact with the flow of phosphoric acid via one or more reagent inlet ports 32 and 34. The reaction of phosphoric acid with ammonium hydroxide is an exothermic reaction, meaning that a substantial amount of heat is generated. It is believed that increased concentrations of higher order polyphosphates, as opposed to the desired monoammonium phosphate, results during this reaction if the temperature thereof is not adequately controlled. Many of these higher order polyphosphates are insoluble and thus undesirable. In addition, plants take up phosphorus in the orthophosphate form and a high ratio of orthophosphate to polyphosphates is therefore essential.

However, when the temperature of the reaction is controlled at a lower temperature, for example 25° C. to 40° C., then this drop in temperature may result in the crystallization of salts and other compounds formed during the reaction. Therefore, the phosphoric acid is used at, or diluted to, a concentration of about a concentration of about 20% to about 30% v/v thereby to prevent salting out of at the working temperature. Preferably the phosphoric acid is at a concentration of about 24% to about 27% v/v prior to the introduction of the ammonium hydroxide to the manufacturing process.

The temperature of the reaction is controlled through the circulation of water from the reservoir 70 through the heat exchanger 60. In addition, the temperature of the reaction is further controlled through manipulation the flow rate of the ammonium hydroxide entering the process through the reagent inlet port or inlet ports. The flow rate of the ammonium hydroxide may be controlled by flow control valves, shown as N and M in FIG. 1. The monitoring of the temperatures, and the resultant control and adjustments of the flow rates through the flow control valves may be automated according to known systems. The combined flow rate of the ammonium hydroxide solution through the flow control valves may be between about 600 and about 850 liters per hour, and ideally the combined flow rate is about 750 liters per hour. The flowrate of the pump 30 during the reaction is about 32 m³ per hour.

The temperature of the reaction is measured at the reagent entry point 62 of the heat exchanger 60 and the product exit point 64 of the heat exchanger. The temperatures are controlled by the adjustment of the temperature control variables, including temperature of the cooling water entering the heat exchanger, the flow rate of the ammonium hydroxide solution, and the starting concentration of phosphoric acid, to be in the range of about 20° C.-45° C.

The reaction monitored by testing the pH of the reaction mixture at regular intervals. Conveniently, the process design may include a sampling port for this purpose (not shown in FIG. 1). Alternatively, the process design may provide for an in-line continuous pH measurement with automatic feedback to a control unit that controls the process parameters. The reaction is terminated with the pH of the reaction mixture has reached a pH value in the range of about 5.5 and about 7.5. Ideally, the reaction is terminated when the reaction mixture has a pH value in the range of about 6-7.

The neutral pH of the monoammonium phosphate solution has several advantages. The product does not have a negative effect on the pH of the soil when applied, microbial activity in the soil is unaffected by the application of the product, and importantly the product can be applied using standard agriculture irrigation equipment, such as centre pivots, without the risk of corrosion damage through sustained use thereof.

Experimental Results—Manufacturing and Analysis

The following three exemplary batches were manufactured according the general method described using the process design as indicated in FIG. 1.

Manufacturing Batch #1 (Batch Process)

| TIME | TEMP (IN) | TEMP (OUT) | FLOW (lt/h) | pH |
|---|---|---|---|---|
| 08 h 00 | 35.8 | 39.6 | 750 | 0.13 |
| 08 h 15 | 35.7 | 39.6 | 775 | 0.43 |
| 08 h 30 | 33.8 | 37.4 | 760 | 0.59 |
| 08 h 45 | 32.9 | 36.8 | 750 | 0.64 |
| 09 h 00 | 32.1 | 36.2 | 739 | 0.72 |
| 09 h 15 | 31.4 | 35.3 | 726 | 0.99 |
| 09 h 30 | 31 | 34.8 | 720 | 1.14 |
| 09 h 45 | 30.5 | 34.4 | 712 | 1.5 |
| 10 h 00 | 29.8 | 33.9 | 707 | 1.73 |
| 10 h 15 | 29.6 | 33.6 | 695 | 1.98 |
| 10 h 30 | 29.4 | 33.4 | 688 | 2.11 |
| 10 h 45 | 29.2 | 33.3 | 681 | 2.76 |
| 11 h 00 | 29 | 33.1 | 675 | 3.32 |
| 11 h 15 | 29 | 33 | 670 | 4.01 |
| 11 h 30 | 29 | 32.9 | 662 | 5.69 |
| 11 h 45 | 28.2 | 32.1 | 706 | 5.84 |
| 12 h 00 | 28.7 | 32.5 | 805 | 5.99 |
| 12 h 15 | 29 | 32.8 | 799 | 6.01 |
| 12 h 30 | 29.1 | 32.9 | 801 | 6.67 |
| 12 h 45 | 28.7 | 32.5 | 812 | 6.99 |
| 12 h 55 | 28.8 | 32.5 | 816 | 7.11 |

The total reaction time was 4 hours 55 minutes and the reaction was terminated at a final pH value of 7.11.

Manufacturing Batch #2 (Batch Process)

| TIME | TEMP (IN) | TEMP (OUT) | FLOW (lt/h) | ph |
|---|---|---|---|---|
| 06 h 00 | 38.3 | 41.8 | 750 | 0.19 |
| 06 h 15 | 36.7 | 40.3 | 775 | 0.27 |
| 06 h 30 | 34.4 | 38.5 | 775 | 0.41 |
| 06 h 45 | 32.6 | 36.7 | 775 | 0.43 |
| 07 h 00 | 32.2 | 36.1 | 743 | 0.65 |
| 07 h 15 | 31.5 | 35.3 | 732 | 0.89 |
| 07 h 30 | 30.8 | 34.7 | 729 | 1.11 |
| 07 h 45 | 30.5 | 34.5 | 712 | 1.55 |
| 08 h 00 | 29.7 | 33.8 | 709 | 1.7 |
| 08 h 15 | 29.4 | 33.5 | 701 | 1.99 |
| 08 h 30 | 29.4 | 33.4 | 688 | 2.03 |
| 08 h 45 | 29.2 | 33.1 | 681 | 2.51 |
| 09 h 00 | 28.7 | 32.8 | 673 | 3.33 |
| 09 h 15 | 28.6 | 32.7 | 666 | 3.89 |
| 09 h 30 | 28.6 | 32.8 | 662 | 5.7 |
| 09 h 45 | 28.3 | 32.1 | 699 | 5.86 |
| 10 h 00 | 28.7 | 32.5 | 787 | 6.01 |
| 10 h 15 | 28.8 | 32.6 | 799 | 6.21 |
| 10 h 30 | 28.8 | 32.6 | 805 | 6.65 |
| 10 h 45 | 28.7 | 32.5 | 813 | 6.96 |
| 11 H 02 | 28.6 | 32.2 | 834 | 6.99 |

The total reaction time was 5 hours 2 minutes and the reaction was terminated at a final pH value of 6.99.

Manufacturing Batch #3 (Batch Process)

| TIME | TEMP (IN) | TEMP (OUT) | FLOW (lt/h) | pH |
|---|---|---|---|---|
| 06 h 00 | 36.3 | 39.8 | 750 | 0.11 |
| 06 h 15 | 35.8 | 39.6 | 775 | 0.32 |
| 06 h 30 | 34.1 | 38.1 | 774 | 0.55 |
| 06 h 45 | 32.9 | 36.8 | 750 | 0.57 |
| 07 h 00 | 32.2 | 36.2 | 746 | 0.71 |
| 07 h 15 | 31.3 | 35.1 | 734 | 0.89 |
| 07 h 30 | 30.5 | 34.3 | 724 | 0.99 |
| 07 h 45 | 30.3 | 34.2 | 711 | 1.12 |
| 08 h 00 | 29.9 | 33.7 | 709 | 1.21 |
| 08 h 15 | 29.6 | 33.5 | 701 | 1.67 |
| 08 h 30 | 29.5 | 33.4 | 689 | 1.99 |
| 08 h 45 | 29 | 32.8 | 683 | 2.57 |

-continued

| TIME | TEMP (IN) | TEMP (OUT) | FLOW (lt/h) | pH |
|---|---|---|---|---|
| 09 h 00 | 28.7 | 32.6 | 680 | 3.33 |
| 09 h 15 | 28.7 | 32.6 | 675 | 3.87 |
| 09 h 30 | 28.5 | 32.3 | 665 | 4.76 |
| 09 h 45 | 28.3 | 32 | 698 | 5.49 |
| 10 h 00 | 28.8 | 32.5 | 765 | 5.99 |
| 10 h 15 | 28.7 | 32.5 | 806 | 6.12 |
| 10 h 30 | 28.9 | 32.6 | 823 | 6.76 |
| 10 h 45 | 28.6 | 32.4 | 819 | 6.83 |
| 10 h 50 | 28.3 | 31.9 | 821 | 7.22 |

The total reaction time was 4 hours 50 minutes and the reaction was terminated at a final pH value of 7.22.

A sample of one of the manufacturing batches was submitted for testing to an independent accredited testing laboratory (Intertek Agriculture South Africa, Johannesburg) to verify the concentration of total phosphate and the concentration of phosphate available as orthophosphate, as well as the concentration of total nitrogen and the concentration of nitrogen available as ammonium nitrogen.

The following table is an extract of the certificate of analysis as received from the testing laboratory:

| TEST DESCRIPTION | METHOD | UNCERTAINTY OF MEASUREMENT | SPECIFICATION | RESULT |
|---|---|---|---|---|
| Ammonium Nitrogen as N, % m/m | INTERTEK IHM/F001 | 0.016 | Report | 6.96 |
| Nitrate Nitrogen as N, % m/m | INTERTEK IHM/F002 | 0.007 | Report | <0.1 |
| Urea Nitrogen as N, % % m/m | INTERTEK IHM/F004 | 0.067 | Report | <0.1 |
| Total Nitrogen as N, % m/m | Calculation | — | Report | 6.96 |
| Ortho Phosphate as P, % m/m | INTERTEK IHM/F003 | 0.018 | Report | 9.95 |
| Total Phosphate as P, % m/m | INTERTEK IHM/F005 | 0.033 | Report | 10.00 |
| Poly Phosphate as P, % m/m | Calculation | — | Report | 0.05 |
| pH | *pH Meter | — | Report | 6.85 |
| Density, Kg/L | *Gravimetric | — | Report | 1.25 |

As can be seen from the above results, the method according to the present invention importantly produces a orthophosphate fertilizer solution at a pH of between 6 and 7, having a orthophosphate to polyphosphate ratio of 9.95:0.05.

Experimental Results—Field Testing and Results
Seed Experiment #1—Maize

Maize seeds were planted. A first section of the plantation was treated with the product manufactured according to the invention, while the remaining section was left untreated.

The product manufactured according to the present invention contains neutral monoammonium phosphate that is surprisingly stable to attack from cations contained in the soil. As a result, the phosphorus in the form of orthophosphate is readily available for plant uptake especially in tasselling and seed formation. High concentrations of charged particles (ions) increase the rate of water migration in soil. Therefore, the higher the salt index of fertilizer, the higher the possibility that the water migrates in the soil to the fertilizer band, and the zone where the seed lies is dried out. This may lead to germination problems and comprised osmotic water uptake.

Figure 2:
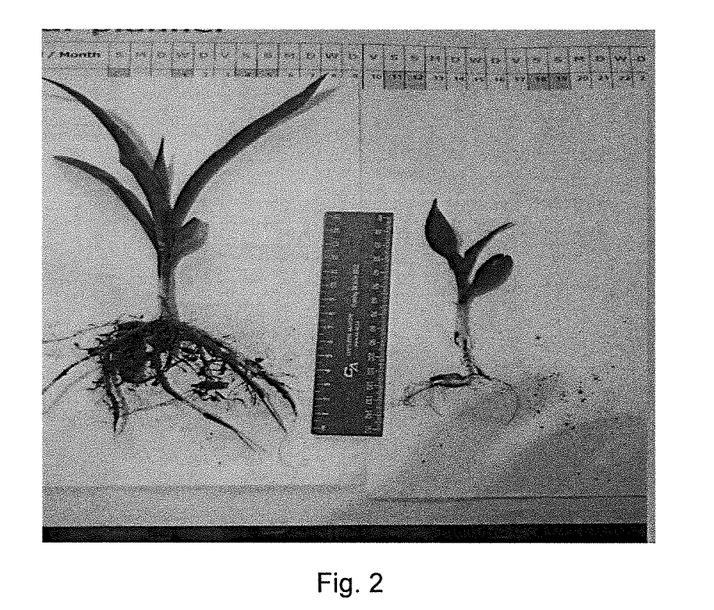
FIG. 2 shows a photograph of two maize plants planted on the same day, with the plant shown on the left hand side having been treated with the product manufactured according to the method of the present invention.
Figure 4:
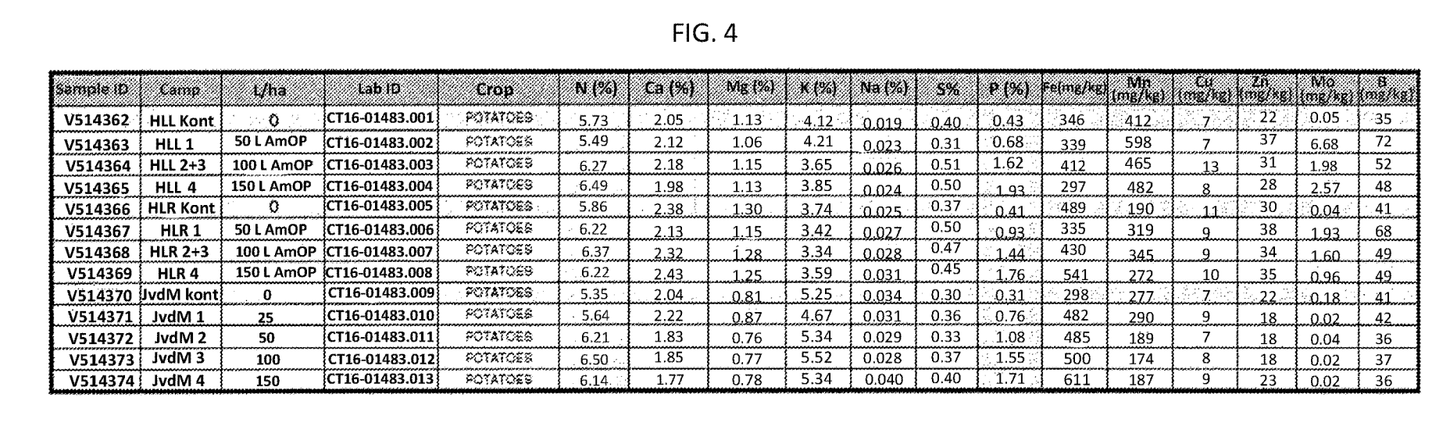
FIG. 4 shows a results table for various experiments conducted on potato crops.
Figure 5:
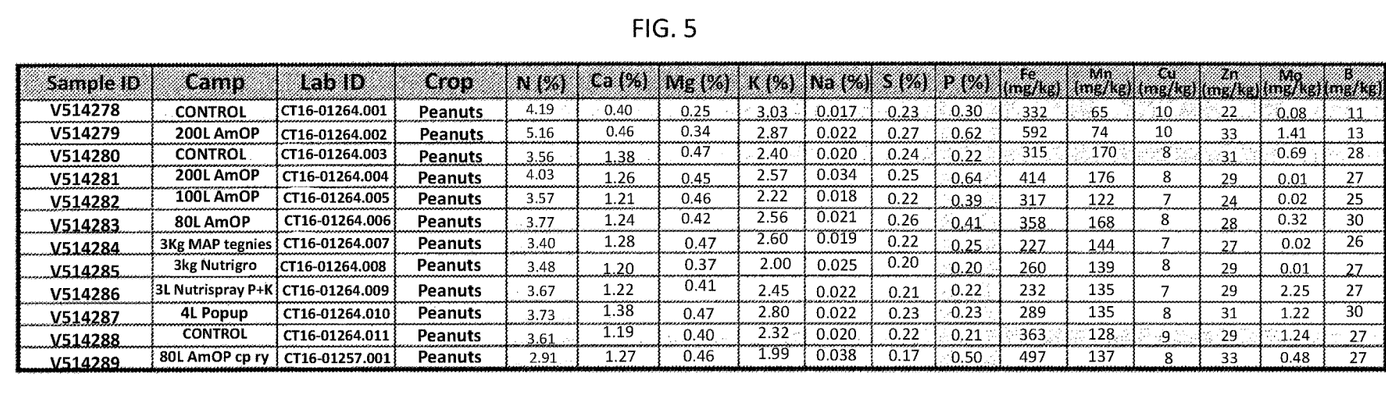
FIG. 5 shows a results table for various experiments conducted on peanut crops.

FIG. 2 shows a photograph of two maize plants which were planted on the same day. The maize plant shown on the left hand side is a representative plant of the section of maize plants that was treated with the product manufactured according to the invention. As can be seen from FIG. 2, the treated plant has shown leaf and root growth that is substantially greater than that of the representative untreated plant shown on the right hand side.

Crop Application—Maize, Potato, and Peanuts

Experiments were conducted on planted maize, potato and peanut crops to determine the availability of phosphorus and nitrogen based on a spray application of the ammonium phosphate fertilizer solution prepared according to the invention. In the following Figure the fertilizer solution of the present invention is referred to as "AmOP".

The general procedure in conducting these experiments was as follows:
  a determination of the crop nutrient deficiency is made by send leave samples to an accredited laboratory;
  the nutrient deficiency is then addressed by a direct spray application of the AmOP product on the leaves of the plants;
  based on the nutrient analysis
  representative samples of both the sprayed and unsprayed leaves were harvested 4 hours after the spray application and sent to an accredited testing facility (SGS South Africa, Cape Town, South Africa);
  the leaves were submitted to a rinsing step to remove any residual product;
  macro and micro nutrient analysis were conducted.

FIGS. 3 to 6 provide tables of the results obtained for spray applications of the product on maize, potato and peanut crops.

It is well known that phosphates bind with Fe and Al ions in low pH soils, and with Ca and Mg ions in high pH soils. As result it is generally only available at between 15 and 30%. It is therefore currently nearly impossible to provide more than 3 kg P (0.86 gr/kg) monoammonium phosphate (technical) to a plant to address its energy needs.

As can be seen from the results presented in FIGS. 3 to 6, using a spray application of AmOP was is possible to provide up to 200 lt (10 kg P en 7 kg N active) to all the tested crops without any damage to the leaves of the plants. Further, in maize for example, for each kg of AmOP (P & N) sprayed onto the crops a 20 kg (P & N) soil band application is required to achieve comparable results.

Crop Application—Vegetative Growth (Maize)

Figure 7A:
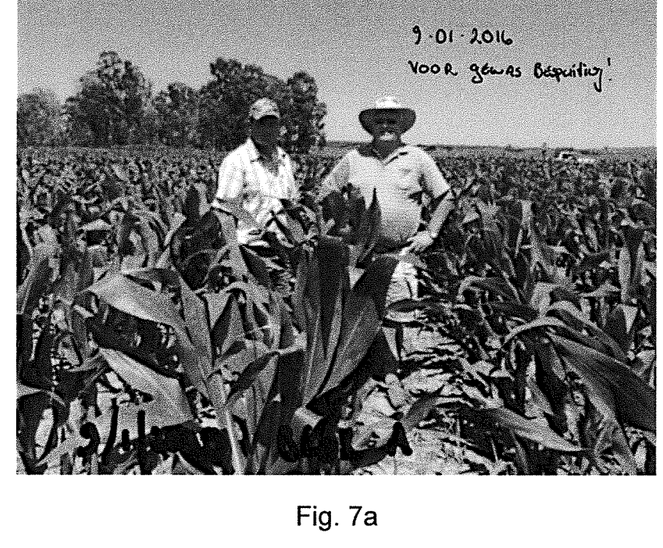
FIG. 7a shows a photograph of a maize plantation prior to the spray application of the product manufactured according to the invention.
Figure 7B:
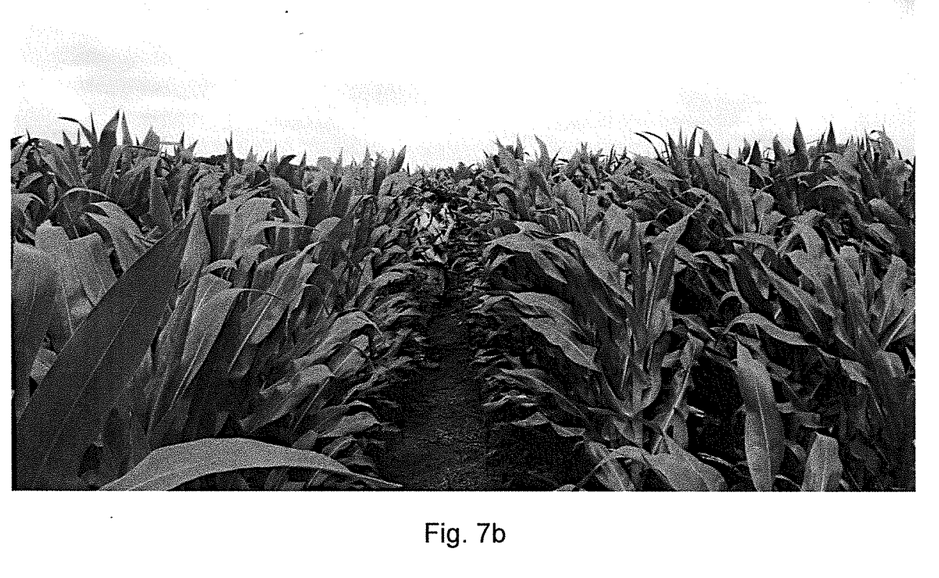
FIG. 7b shows a photograph of a maize plantation 6 days after a spray application of the product manufactured according to the invention.

FIGS. 7a and 7b shows the same plantation of maize prior to a spray application of AmOP and 6 days after a spray application of 10 kg P per ha. When using MAP technical, it is only possible to spray a maximum of 1 kg P per ha before damage is inflicted on the plants.

The result of an increased availability of phosphorus on vegetative growth of maize crops is readily apparent from a comparison of FIGS. 7a and 7b.

The invention claimed is:

1. A method for producing an aqueous monoammonium orthophosphate containing fertilizer solution, the method comprising the steps of:
   a) providing phosphoric acid at a concentration of 20% to 30% v/v in a first vessel;
   b) circulating the phosphoric acid through a product reaction zone having a reagent entry point and a product exit point,
   c) contacting the phosphoric acid with a solution of ammonium hydroxide at the product reaction zone to form a reaction mixture,
   d) separately measuring the temperature of the reaction mixture in the reaction zone at the reagent entry point and the product exit point of the reaction zone, wherein the temperature of the reaction mixture in the reaction zone is at least partially controlled by adjusting the flow rate of the ammonium hydroxide solution, wherein the temperature of the reaction mixture in the reaction zone is controlled such that the reagent entry point and product exit point is maintained at between 28.3° C. and 41.8° C.,
   e) monitoring the pH of the reaction mixture, and
   f) terminating the reaction when the reaction mixture has reached a pH of between 5.5 and 7.5,
      wherein the monoammonium orthophosphate containing fertilizer solution has an orthophosphate to polyphosphate ratio of more than 9:1.

2. The method according to claim 1, wherein the method is a batch method.

3. The method according to claim 1, wherein the reaction is terminated at a pH of between 6 and 7.

4. The method according to claim 1, wherein the monoammonium orthophosphate containing fertilizer solution has an orthophosphate to polyphosphate ratio in a range of 9.5:1 to 9.95:0.05.

5. The method of claim 1, wherein the monoammonium orthophosphate containing fertilizer solution has a nitrogen to phosphate ratio of 1:1.4.

6. The method according to claim 4, wherein the monoammonium orthophosphate containing fertilizer solution has an orthophosphate to polyphosphate ratio of 9.95:0.05.

7. The method according to claim 1, wherein the phosphoric acid is provided at a concentration of 24% to 27%.

8. The method according to claim 7, wherein the phosphoric acid is provided at a concentration of 25%.

9. The method according to claim 1, wherein the phosphoric acid is circulated via a pump from the first vessel through the reaction zone and back to the first vessel.

10. The method according to claim 1, wherein the ammonium hydroxide solution is introduced to the reaction zone through at least one reagent inlet port, where the ammonium hydroxide solution contacts with the phosphoric acid and is circulated to the first vessel.

11. The method according to claim 1, wherein the method comprises using two reagent inlet ports.

12. The method according to claim 1, wherein the phosphoric acid solution is prepared by providing phosphoric acid in the first vessel in an undiluted form, adding water to the first vessel, then circulating the mixture via a pump from the first vessel through the reaction zone and back to the first vessel for a set time.

13. The method according to claim 1, wherein the flow rate of the ammonium hydroxide solution is between 600 and 850 liters per hour.

14. The method according to claim 13, wherein the flow rate of the ammonium hydroxide solution is between 650 and 800 liters per hour.

15. The method according to claim 13, wherein the flow rate of the ammonium hydroxide solution is 750 liters per hour.

* * * * *